US012591594B2

(12) United States Patent
Mogaki

(10) Patent No.: US 12,591,594 B2
(45) Date of Patent: Mar. 31, 2026

(54) INFORMATION PROCESSING APPARATUS PROVIDING DATA TRANSFER SUPPORT SYSTEM, AND DATA TRANSFER METHOD

(71) Applicant: CANON KABUSHIKI KAISHA, Tokyo (JP)

(72) Inventor: Shunsuke Mogaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 224 days.

(21) Appl. No.: 18/057,770

(22) Filed: Nov. 22, 2022

(65) Prior Publication Data

US 2023/0169092 A1 Jun. 1, 2023

(30) Foreign Application Priority Data

Nov. 29, 2021 (JP) ................................. 2021-193540

(51) Int. Cl.
G06F 16/27 (2019.01)
G06F 3/06 (2006.01)
(52) U.S. Cl.
CPC .......... G06F 16/273 (2019.01); G06F 3/0604 (2013.01); G06F 3/0652 (2013.01); G06F 3/067 (2013.01)
(58) Field of Classification Search
CPC .... G06F 16/273; G06F 3/0604; G06F 3/0652; G06F 3/067
See application file for complete search history.

(56) References Cited

U.S. PATENT DOCUMENTS

| | | | | |
|---|---|---|---|---|
| 5,235,700 A | * | 8/1993 | Alaiwan | G06F 11/2028 |
| | | | | 714/13 |
| 6,381,600 B1 | * | 4/2002 | Lau | G06F 16/284 |
| 6,567,823 B1 | * | 5/2003 | Rothschild | G06F 16/214 |
| 6,889,231 B1 | * | 5/2005 | Souder | G06F 16/273 |
| 7,865,475 B1 | * | 1/2011 | Yadav | G06F 16/128 |
| | | | | 707/655 |
| 9,858,114 B2 | | 1/2018 | Fries | |
| 10,020,996 B1 | * | 7/2018 | Protasov | H04L 41/40 |

(Continued)

FOREIGN PATENT DOCUMENTS

JP 2014-523026 A 9/2014

*Primary Examiner* — Anhtai V Tran
*Assistant Examiner* — Huen Wong
(74) *Attorney, Agent, or Firm* — VENABLE LLP

(57) ABSTRACT

A data transfer tool is a data transfer support system that collectively acquires data that is managed in a plurality of tables that have been stored on a transfer source service DB, and works in cooperation with a data migration service for performing a transfer, wherein the data transfer support system includes a data storage unit that executes storage processing to sequentially store data that is sequentially output by the data migration service based on acquisition from the transfer source service DB on a transfer-use DB; a processing target data acquisition unit that acquires data from the transfer-use DB; a transfer processing unit that, in the case in which the data that has been acquired satisfies a condition, performs registration processing for transferring the data to a transfer destination cloud service DB; and a data re-registration unit that, in the case in which the data that has been acquired does not satisfy the condition, re-registers the data to the transfer-use DB.

7 Claims, 9 Drawing Sheets

(56) References Cited

U.S. PATENT DOCUMENTS

| | | | | |
|---|---|---|---|---|
| 2002/0016792 | A1* | 2/2002 | Ito | G06F 3/0635 |
| 2002/0169766 | A1* | 11/2002 | Aoyama | G06F 16/10 |
| 2003/0004975 | A1* | 1/2003 | Nakano | G06F 16/284 |
| 2005/0144254 | A1* | 6/2005 | Kameda | G06F 3/0635 |
| | | | | 709/217 |
| 2005/0251635 | A1* | 11/2005 | Yoshinari | G06F 11/1464 |
| | | | | 714/E11.122 |
| 2006/0077726 | A1* | 4/2006 | Shimmitsu | G06F 11/2094 |
| 2006/0129513 | A1* | 6/2006 | Nakatani | G06F 3/0647 |
| 2007/0079100 | A1* | 4/2007 | Shiga | G06F 3/061 |
| | | | | 711/170 |
| 2007/0239655 | A1* | 10/2007 | Agetsuma | G06F 3/067 |
| 2008/0148288 | A1* | 6/2008 | Kaneda | H04L 41/06 |
| | | | | 719/318 |
| 2008/0159288 | A1* | 7/2008 | Nagarajan | H04L 45/28 |
| | | | | 370/392 |
| 2008/0208927 | A1* | 8/2008 | Chikusa | G06F 3/0605 |
| | | | | 707/999.203 |
| 2008/0209363 | A1* | 8/2008 | Kuroda | G06Q 10/10 |
| | | | | 715/764 |
| 2009/0037422 | A1* | 2/2009 | Wong | G06F 16/27 |
| 2009/0055891 | A1* | 2/2009 | Okamoto | H04L 63/101 |
| | | | | 726/1 |
| 2009/0198946 | A1* | 8/2009 | Ebata | G06F 3/067 |
| | | | | 711/E12.001 |
| 2009/0222631 | A1* | 9/2009 | Sugiura | G06F 3/0649 |
| | | | | 711/E12.001 |
| 2009/0228527 | A1* | 9/2009 | Wang | G06F 3/067 |
| | | | | 707/999.203 |
| 2010/0205232 | A1* | 8/2010 | Moriwake | G06F 3/0625 |
| | | | | 711/E12.001 |
| 2010/0299565 | A1* | 11/2010 | Muro | G06F 11/1441 |
| | | | | 714/E11.062 |
| 2011/0191306 | A1* | 8/2011 | Akagawa | G06F 16/162 |
| | | | | 707/E17.005 |
| 2011/0246763 | A1* | 10/2011 | Karnes | H04L 69/14 |
| | | | | 711/E12.001 |
| 2012/0079064 | A1* | 3/2012 | Fukushima | H04N 1/32416 |
| | | | | 709/217 |
| 2012/0101973 | A1* | 4/2012 | Ito | G06F 16/185 |
| | | | | 706/50 |
| 2012/0221536 | A1* | 8/2012 | Chen | G06F 16/275 |
| | | | | 707/802 |
| 2013/0046946 | A1* | 2/2013 | Ogasawara | G06F 3/0647 |
| | | | | 711/E12.103 |
| 2013/0293694 | A1* | 11/2013 | Mizobe | H04N 7/183 |
| | | | | 348/77 |
| 2014/0198792 | A1* | 7/2014 | Ueno | H04L 45/34 |
| | | | | 370/392 |
| 2014/0208049 | A1* | 7/2014 | Furusawa | G06F 9/45558 |
| | | | | 711/162 |
| 2015/0370501 | A1* | 12/2015 | Aikoh | G06F 3/0647 |
| | | | | 711/114 |
| 2016/0012095 | A1* | 1/2016 | Masuda | H04L 67/535 |
| | | | | 707/648 |
| 2018/0011886 | A1* | 1/2018 | LeFevre | G06F 16/2379 |
| 2018/0060162 | A1* | 3/2018 | Qiang | G06F 11/1458 |
| 2019/0129616 | A1* | 5/2019 | Nguyen | G06F 3/0647 |
| 2019/0188036 | A1* | 6/2019 | Yamamoto | G06F 9/4856 |
| 2021/0103400 | A1* | 4/2021 | Kamo | G06F 3/0673 |
| 2022/0374442 | A1* | 11/2022 | Kaspa | G06F 16/2282 |
| 2023/0153008 | A1* | 5/2023 | Yoshida | G06F 3/0647 |
| | | | | 711/165 |
| 2024/0232407 | A1* | 7/2024 | Calo | H04L 63/20 |

* cited by examiner

FIG. 1

INFORMATION PROCESSING APPARATUS PROVIDING DATA TRANSFER SUPPORT SYSTEM, AND DATA TRANSFER METHOD

BACKGROUND OF THE INVENTION

Field of the Invention

The present invention relates to the transfer of data that is managed on an on-premises data base to a cloud service.

Description of Related Art

In recent years, accompanying the popularization of cloud services, cases in which services that were provided by being hosted on an on-premises server are transferred to cloud services with various goals such as scaling up the service and increasing its stability, reducing costs, or the like, are increasing. In such cases, it is required that the data that is managed on the on-premises database be transferred to the cloud service so as not to damage the pre-transfer data. Therefore, vendors that provide cloud services also provide services for transferring data from on-premises databases to cloud services. For example, Amazon Web Service provides a service called the "AWS Database Migration Service". In addition, Microsoft Azure provides a service called the "Azure Database Migration Service". By using these data transfer services, the service providers are able to simply and securely transfer on-premises data to cloud services. Thereby, it is possible to transfer on-premises services to cloud services without losing any data.

When transferring data, there are cases in which the data format changes between the on-premises service and the cloud service. For example, there are cases in which a new ID is issued during the transfer in order to preserve uniqueness within the cloud service, cases in which the data is converted into formats that are easy to manage on the cloud service database, or the like. Japanese Translation of PCT International Application Publication No. 2014-523026 discloses a method in which a transfer standard is identified and applied to an application so that the application can be executed on the application hosting cloud of the transfer destination.

It is often the case that on-premises services use relational databases, and generally, in databases with this format, relations are created between a plurality of tables, and associations are made. When on-premises data is transferred, in the case in which the data is managed in a plurality of tables in a relational database, there are cases in which sequence controls for the data transfer are necessary. For example, when transferring a user management service that manages the information for the organization to which a user belongs and user account information to a cloud service, there is a concern that it is possible that if the organization information, which is a higher order table, has not been transferred, the user information will not be able to be transferred. In the method from Japanese Translation of PCT International Application Publication No. 2014-523026, it is not possible to identify the relationships between tables, and therefore, it is necessary to transfer all of the tables, and the data transfer takes time.

In addition, in order to not leave out any data when making the transfer to the cloud service, the process of transferring the entirety of the data to the cloud service after stopping the on-premises service and restarting the service once the transfer has been completed is necessary. For example, in a service with communications from across the globe such as a service in which the service that was provided on-premises manages device information, the service will continuously receive large amounts of data, and therefore, it is necessary to stop the service when performing the transfer. However, the time period during which this is stopped becomes as is a downtime for the entirety of the service, and thus, it is preferable that the data transfer is performed quickly so as to shorten the time period during which the service is stopped.

SUMMARY OF THE INVENTION

The present invention shortens the time taken to transfer data.

The data transfer support system of the present invention is a data transfer support system that is configured to collectively acquire data that is managed in a plurality of tables that have been stored on a database of a transfer source system, and to work in cooperation with a data transfer service for performing a transfer, wherein the data transfer support system includes a storage unit configured to execute storage processing to sequentially store data that is sequentially output by the data transfer service based on acquisition from the database of the transfer source system to a database for use in the transfer process; an acquisition unit configured to acquire data from the database for use in the transfer; a transfer unit configured to, in the case in which the data that has been acquired satisfies a condition, perform registration processing for transferring the data to a database of a transfer destination system; and a re-registration unit configured to, in the case in which the data that has been acquired does not satisfy the condition, re-register the data to the database for use in the transfer process.

Further features of the present invention will become apparent from the following description of exemplary embodiments with reference to the attached drawings.

BRIEF DESCRIPTION OF THE DRAWINGS

FIG. 1 is a diagram showing an example of a system configuration.

DETAILED DESCRIPTION OF THE INVENTION

First Embodiment

Figure 1:
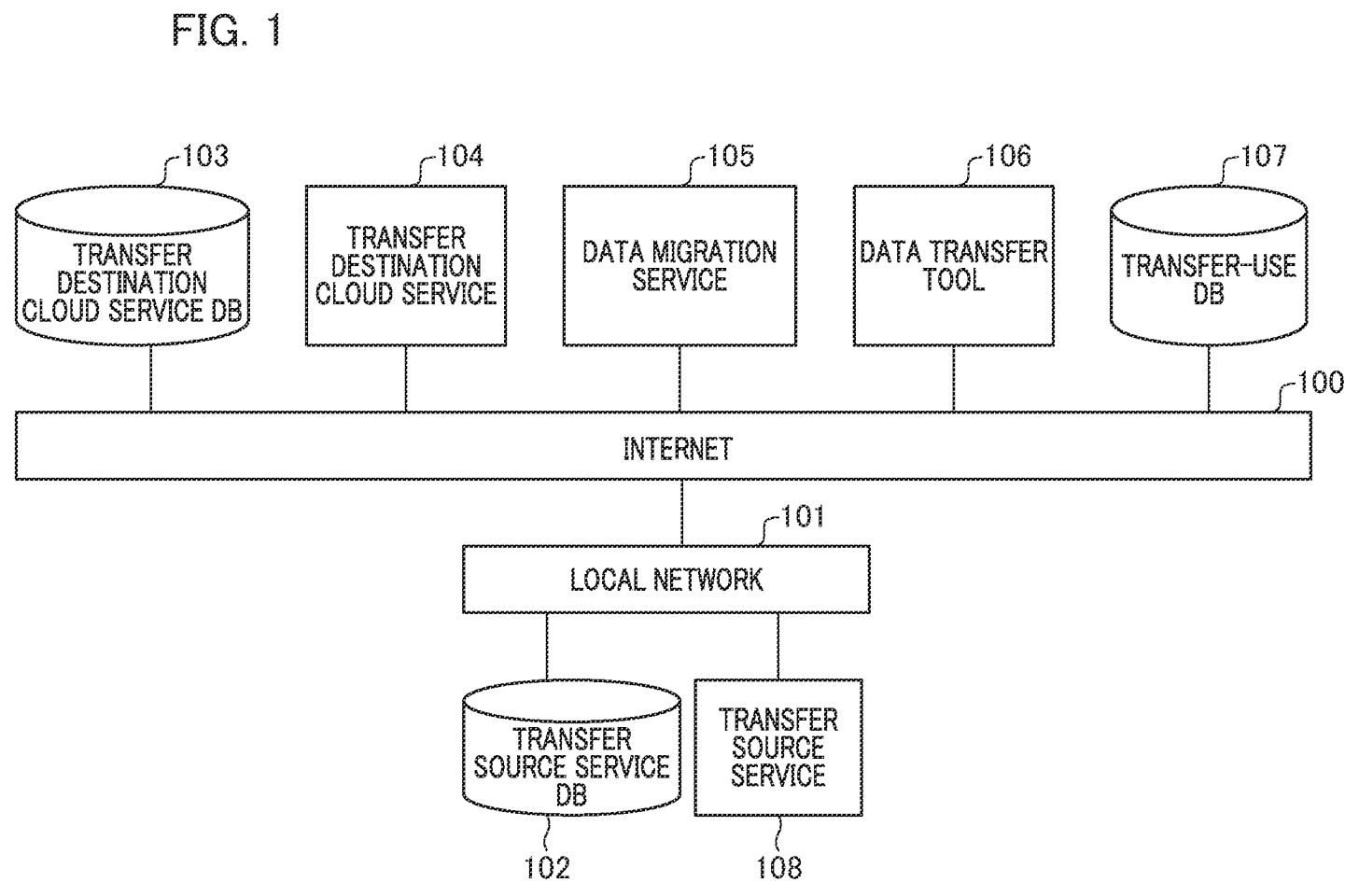
Figure 2:
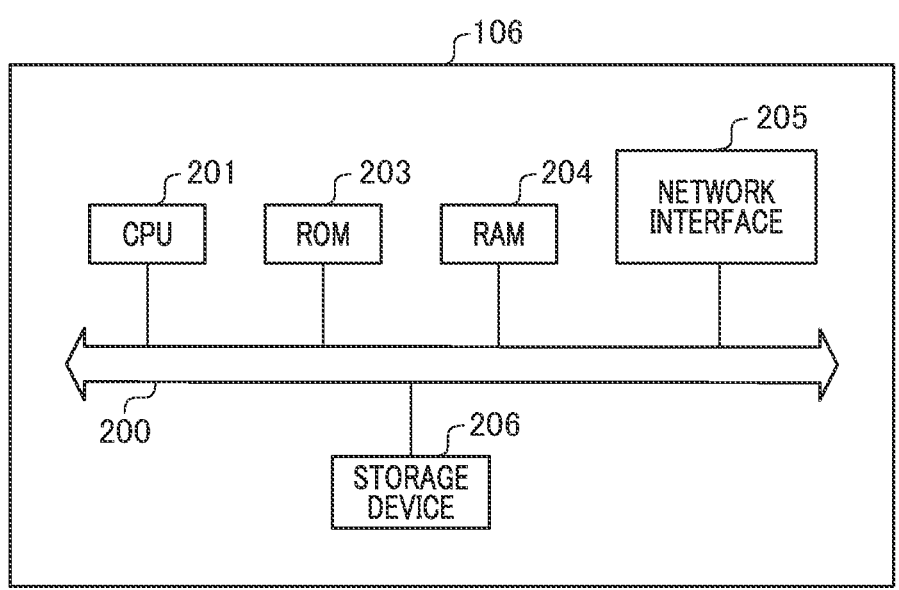
FIG. 2 is a diagram showing an example of a hardware configuration.

In the present embodiment, a data transfer support system that works in cooperation with a data transfer service for transferring data from a data transfer source system to a data transfer destination system via a network, and a data transfer method will be explained. FIG. 1 is a diagram showing an example of a configuration of a network system. The data transfer source system and the data transfer destination system according to the present embodiment are realized on the network system that is shown in FIG. 1.

In the present embodiment, an example will be explained in which a portion of the data that is in a transfer source service DB10, which is the database (DB) of the transfer source system is transferred to a transfer destination cloud service DB103, which is the database of a transfer destination cloud service 104. A data migration service 105 is used in the transfer of the data. The data migration service 105 is fundamentally a tool for collectively transferring data that is in the transfer source database. For this reason, in the present Embodiment, only a portion of the data is transferred to the transfer destination database, and therefore, a data transfer tool 106, which is a data transfer support system that works in cooperation with the data migration service 105, is also used, and the data transfer is performed.

The network system has a transfer source service 108, the transfer source service DB 102, the transfer destination cloud service DB 103, the transfer destination cloud service 104, the data migration service 105, the data transfer tool 106, and a transfer-use DB 107. These are connected via a network. The network may be configured by one or a combination of a communication network such as a LAN, a WAN, or the like, a cellular network (for example, LTE, 5G, or the like), a wireless network, a telephone line, a digital leased line, or the like. That is, it is sufficient if the network is configured so as to be able to send and receive data, and any system may be used as the communication system. In the present Embodiment, an example will be explained of a case in which the transfer source service DB 102 is connected to a local network 101, and the local network 101 and the transfer destination cloud service DB 103 to the transfer-use DB 107 are connected to an internet 100. The internet 100 is a public network that can be connected externally, such as the internet, or the like. The local network 101 is a private network that cannot be connected externally, such as a LAN (Local Area Network), or the like.

The transfer source service 108 is a service that is provided by the data transfer source system. The transfer source service DB 102 is a database that stores the data for the data transfer source system. In the present embodiment, the transfer source service 108 is an on-premises service that is used in-house, and an example is explained of a case in which the transfer source service DB 102 is a database for use by the on-premises service. However, the present invention is not limited thereto. For example, the transfer source service 108 may also be a cloud service. The transfer destination cloud service 104 is a service that is provided by the data transfer destination system. The transfer destination cloud service 104 provides, for example, a cloud service. The transfer destination cloud service 104 receives data registration via the network, and has a function that creates and saves data to the transfer destination cloud service DB 103. The transfer destination cloud service DB 103 is a data base that stores data managed by the transfer destination cloud service 104. Note that the transfer destination cloud service DB 103 may also be configured on a virtual network that is logically separated from the internet 100, and in this case, becomes a configuration that cannot be directly accessed from the internet 100.

The data migration service 105 is a service for transferring data provided by the cloud vendor who provides the transfer destination cloud service 104. The data migration service 105 collectively acquires data that has been stored on the database of the transfer source system in order to transfer data from the transfer source system to the transfer destination system, and sequentially outputs data to the data transfer tool 106 based on the acquisition, In the present embodiment, the data migration service 105 acquires data from the transfer source service DB 102 and temporarily stores the acquired data on a storage that has been constructed inside a virtual network. The virtual network on which the data migration service 105 stores the data acquired from the transfer source service DB 102 is constructed to serve as a different network from the data transfer destination system.

The data transfer tool 106 performs processing to transfer the data that the data migration service 105 acquires from the transfer source system and outputs to the transfer destination system. The transfer-use DB 107 is a database for use during the transfer process on which the data transfer tool 106 temporarily stores data. The data transfer tool 106 and the transfer-use DB 107 are constructed inside the virtual network on which the data migration service 105 has stored data. Note that the location in which the data transfer tool 106 temporarily stores data is not limited to the transfer-use DB 107, and may also be a messaging service or streaming data management service that uses a queue for temporarily storing data, or the like.

FIG. 2 is a diagram showing an example of a general hardware configuration for an information processing apparatus that provides the data transfer tool 106 according to the present Embodiment. The information processing apparatus that provides the data transfer tool 106 has a CPU 201, a ROM 203, a RAM 204, a network I/F 205, a storage device 206, and a system bus 200 that connects these to each other.

The CPU (Central Processing Unit) 201 integrally controls access to each type of device that is connected to the system bus 200, and performs control for the entirety of the data transfer tool 106. The ROM (Read Only Memory) 203 is a memory that exclusively reads out data, and stores, for example, control programs and the like for the data transfer tool 106 such as a basic I/O program or the like. The CPU 201 performs the control of the entirety of the data transfer tool 106 based on a control program, resource data (resource information), and the like that have been stored on a storage device 206 that is connected via a control program or a disk controller that has been stored on the ROM 203. The RAM (Random Access Memory) 204 is a memory that is able to read/write data. The RAM 204 is used to serve as, for example, a temporary storage area, or a work area for when the CPU 201 performs each type of processing. Note that the RAM 204 is configured so as to be able to expand the memory capacity using an optional RAM that is connected to an extension port that is not illustrated. The CPU 201 opens each type of control program that has been stored on the ROM 202 and the storage device 206 on the RAM 203.

The network I/F 205 is a network interface such as a network interface card (NIC) or the like. The network I/F 205 is connected to a network such as the internet 100, or the like, and performs the input and output of information between each device on the network via the network. The storage device 206 is a storage device that functions as a large capacity memory, and stores programs such as application programs, an OS that provides the data transfer tool 106, and the like. The storage device 206 may be, for example, an HDD (Hard Disk Drive), an SSD (Solid State Drive), or may also be an apparatus that is able to read/write data by loading an external media such as a memory card.

Note that the information processing apparatus that provides that data transfer tool 106 may be a single device, or may also be a system comprising a plurality of devices.

Furthermore, the data transfer tool 106 may also be a system in which a connection is created via a network such as a LAN, a WAN, or the like, and processing is performed. That is, other than an information processing apparatus, the data transfer tool 106 may also be realized by a virtual machine (cloud service) that uses resources that have been provided by a data center that includes an information processing apparatus. In addition, each information processing apparatus that provides the transfer source service 108, the transfer destination cloud service 104, and the migration service 105, may also be realized by an information processing apparatus that has a CPU and a memory that are similar to the data transfer tool 106, or a cloud service.

Figure 3:
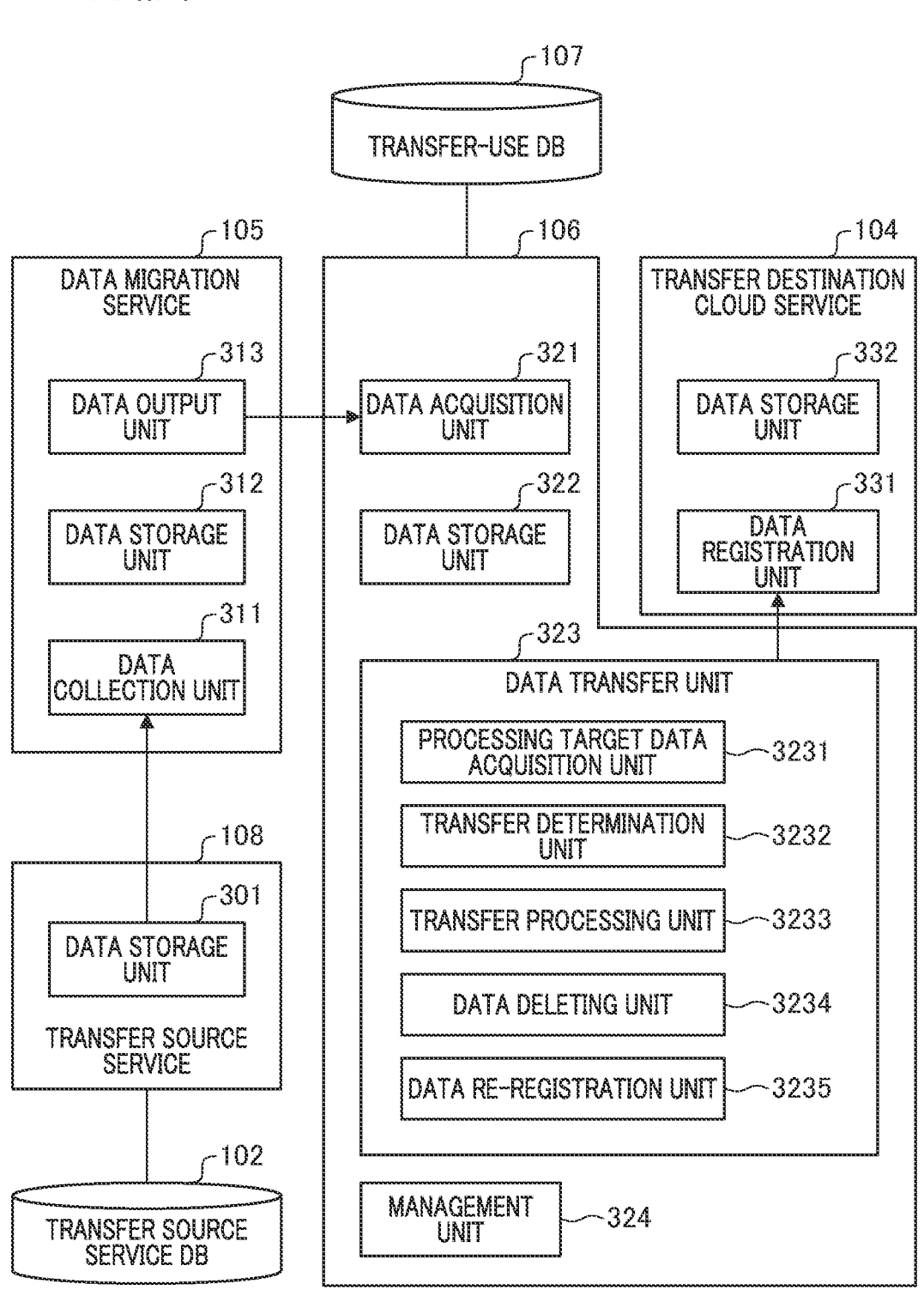
FIG. 3 is a diagram showing an example of a software configuration.

FIG. 3 is a diagram showing an example of a software configuration for the transfer source service 108, the data migration service 105, the data transfer tool 106, and the transfer destination cloud service 104 according to the present embodiment. Each type of module for the data transfer tool 106 is realized by the CPU 201 opening and executing a program that has been saved on a memory (the ROM 203, or the storage device 206) on the RAM 204. In addition, each type of module of the transfer source service 108, the data migration service 105, and the transfer destination cloud service 104 are also realized by the CPU of the apparatus that provides these services executing a program that has been stored on a memory.

The transfer source service 108 has a data storage unit 301. The data storage unit 301 stores the data that was registered and managed by the transfer source service 108 on the transfer source service DB 102. In addition, the data storage unit 301 receives a data transfer (data acquisition) request from the data migration service 105 via the network (the local network 101 or the internet 100), and responds with the stored data.

The data migration service 105 has a data collection unit 311, a data storage unit 312, and a data output unit 313. The data collection unit 311 acquires the entirety of the data from the transfer source service DB 102 of the transfer source. When acquiring data from the transfer source service DB 102, the data collection unit 311 acquires data with a table as the unit. The data storage unit 312 stores the data that the data collection unit 311 has acquired from the transfer source service DB 102 on a storage. The data storage unit 312 stores the data that has been acquired from the transfer source service DB 102 on a storage one by one as streaming data with a table as the unit. The data output unit 313 sequentially outputs data to the data transfer tool 106 based on the acquisition of data from the transfer source service DB 102.

The data transfer tool 106 has a data acquisition unit 321, a data storage unit 322, a data transfer unit 323, and a management unit 324. The data acquisition unit 321 acquires the data that is output from the data migration service 105. The data storage unit 322 stores the data that has been acquired by the data acquisition unit 321 on the transfer-use DB 107 to serve as data awaiting transfer. The transfer-use DB 107 is a database for use during the transfer process, and stores data awaiting transfer. The data transfer unit 323 acquires the data that has been stored on the transfer-use DB 107, and performs processing for transferring data to the transfer destination cloud service 104, which is the transfer destination. The management unit 324 manages data related to the transfer, such as mapping data that has been associated with a pre-transfer ID and a post transfer ID for data that has been transferred, transfer target management data, and the like which are to be described below.

The data transfer unit 323 has a processing target data acquisition unit 3231, a transfer determination unit 3232, a transfer processing unit 3233, a data deleting unit 3234, and a data re-registration unit 3235. The processing target data acquisition unit 3231 acquires data for performing the transfer processing from the transfer-use DB 107. Below, the data that the processing target data acquisition unit 3231 has acquired from the transfer-use DB 107 will be referred to as processing target data. The transfer determination unit 3232 acquires information for registering the processing target data to the transfer destination, and determines if the processing target data satisfies the transfer condition. The transfer processing unit 3233 performs processing for transferring the processing target data that satisfies the condition to the transfer destination cloud service 104. The data deleting unit 3234 deletes the data for which the transfer has been completed and the data that has been determined to be a non-transfer target from the transfer-use DB 107. The data re-registration unit 3235 returns the processing target data that does not satisfy the condition to the transfer-use DB 107, that is, re-registers this as data awaiting transfer.

The transfer destination cloud service 104 has a data registration unit 331, and a data storage unit 332. The data registration unit 331 receives a data registration request from the data transfer tool 106 via the network, and creates data for registration on the transfer destination cloud service DB 103. In addition, the data registration unit 331 returns the registration results to the data transfer destination cloud service DB103 for the data to the data transfer tool 106. The data storage unit 332 registers the data that was created by the data registration unit 331 to the transfer destination cloud service DB 103.

Figure 4:
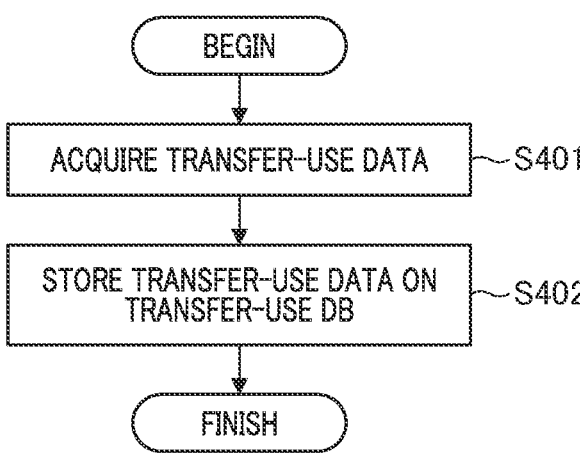
FIG. 4 is a flowchart showing data storage processing.
Figure 5:
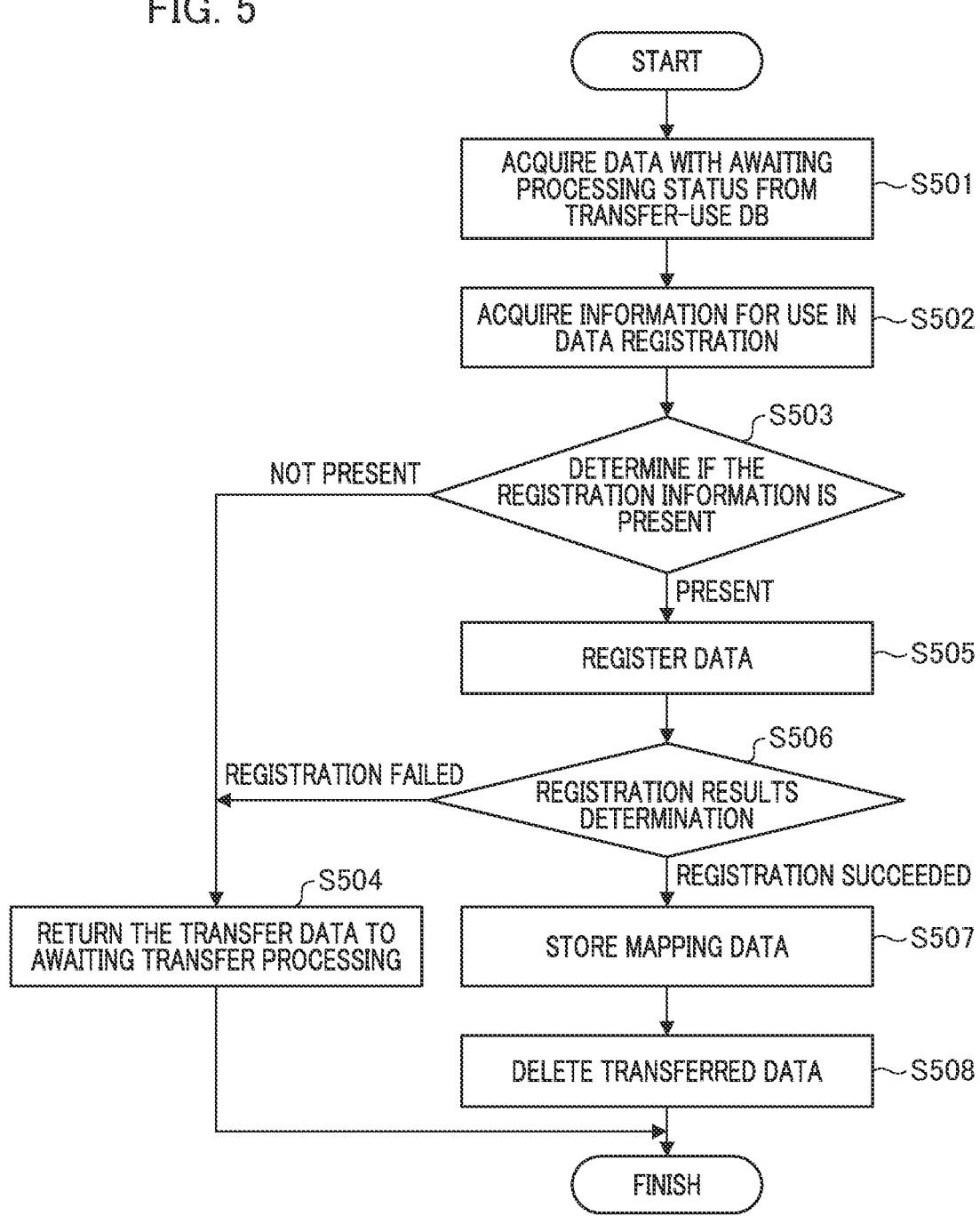
FIG. 5 is a flowchart showing data transfer processing in a First Embodiment.

FIG. 4 and FIG. 5 are flowcharts showing the data transfer processing that is executed by the data transfer tool 106. In FIG. 4, the processing until the data is acquired from the transfer source and stored is shown, and in FIG. 5, the processing for transferring the stored data to the transfer destination is shown. Each process that is shown in FIG. 4, and FIG. 5 is realized by the CPU 201 opening and executing a program that has been saved on a memory (the ROM 203, or the storage device 206) on the RAM 204.

In the present Embodiment, a case in which data that is managed by a device table that manages device information, and data that is managed by an alarm table that manages alarm information that has been generated by each device are transferred is explained as one example. That is, a case is explained in which data that is managed by a plurality of related tables is transferred. Note that although in the present embodiment, an example is explained in which the data transfer tool 106 transfers both the device table and the alarm table, the tool may also be separated using a table as the unit, so as to have a tool that transfers only the device tables and a tool that transfers only the alarm table. In addition, although in the present embodiment, an example is explained in which the device table and the alarm table are made the transfer targets, the present embodiment is not limited thereto. For example, it is sufficient if this is processing that transfers related tables, for example transferring a user account table and a user authority table, and the like. In related tables, it is possible to set data that refers to each table in advance.

First, the data to be transferred in the present embodiment will be explained using Table 1 and Table 2. Table 1 is an example of a device information table that manages device information managed by the transfer source system. Table 2 is an example of an alarm information table that manages alarm information managed by the transfer source system.

The device information and alarm information are stored and managed on the transfer source service DB 102.

TABLE 1

| Device Information | | | | |
|---|---|---|---|---|
| Device ID | Device Serial | Device Name | Manager | Registration Date |
| 0001 | 111-111-111 | Device 1 | User X | 2021 Jan. 1 00:00:00.000 |
| 0002 | 222-222-222 | Device 2 | User X | 2021 Jan. 1 01:00:00.000 |
| 0003 | 333-333-333 | Device A | User Y | 2021 Jan. 2 00:00:00.000 |
| . . . | . . . | . . . | . . . | . . . |

The device information includes, for example, a device ID for uniquely identifying device information that is managed by the transfer source system, a device serial number that is a device unique ID, a device name, a manager, and a registration date.

TABLE 2

| Alarm Information | | | |
|---|---|---|---|
| Alarm ID | Device ID | Alarm Code | Registration Date |
| 0001 | 0001 | CODE001 | 2021 Jan. 1 00:00:00.000 |
| 0002 | 0001 | CODE001 | 2021 Jan. 1 01:00:00.000 |
| 0003 | 0002 | CODE001 | 2021 Jan. 2 00:00:00.000 |
| . . . | . . . | . . . | . . . |

The alarm information includes, for example, an alarm ID for uniquely identifying alarm information that is managed by the transfer source system, a device ID that shows the device that generated the alarm, an alarm code that shows the details of the alarm, and a registration date. In this manner, information that is based on the device information (the device ID) is included in the alarm information.

Next, the processing to acquire the data from the transfer source and store this on the transfer-use DB 107 of the data transfer tool 106 will be explained using FIG. 4. FIG. 4 is a flowchart showing the storage processing for the data to be transferred. First, the data collection unit 311 of the data migration service 105 collects data (device information and alarm information) from the transfer source service DB 102 with a table as the unit, and the data storage unit 312 sequentially stores the collected data on the storage. Next, the data output unit 313 of the data migration service 105 sequentially outputs the data that has been acquired from the transfer source service DB 102 of the transfer source and that has been stored on the data storage unit 312 to the data transfer tool 106. In step S401, the data acquisition unit 321 of the data transfer tool 106 acquires the data that has been collected from the transfer source service DB 102 and is sequentially output by the data migration service 105. The data acquisition unit 321 of the present embodiment sequentially acquires device information and alarm information from the data migration service 105.

In step S402, the data storage unit 322 of the data transfer tool 106 executes storage processing that sequentially stores the data that has been acquired from the data migration service 105 during step S401 to serve as data awaiting transfer on the transfer-use DB 107. Table 3 is an example of data awaiting processing that is managed in the transfer-use DB 107 and is awaiting transfer processing.

TABLE 3

| Data Awaiting Processing | | | |
|---|---|---|---|
| Table | Data Registration Date and Time | Data Processing Status | Transfer-use Data |
| Device | 2021 Jan. 1 00:00:00.000 | Being processed | *** |
| Device | 2021 Jan. 1 00:00:01.000 | Awaiting processing | *** |
| Alarm | 2021 Jan. 1 00:00:00.000 | Awaiting processing | *** |
| . . . | . . . | . . . | . . . |

The data awaiting processing includes, for example, the table information for the transfer target data, the data registration date and time, the data processing status, and the acquired transfer-use data. The table information shows the type of table for the data that has been registered in the transfer-use data. In the present embodiment, the table information is one of "device" or "alarm". In addition, the data processing status is one of "awaiting processing" or "being processed". "Being processed" shows that the data is data that has been acquired from the transfer-use DB 107 by the processing target data acquisition unit 3231 and is undergoing transfer processing in the data transfer unit 323. The data processing status for data that is not "being processed" becomes "awaiting processing". The data registration date and time is the date and time at which the data transfer tool 106 acquired and stored the data on the transfer-use DB. Note that in the case in which the data processing status has been returned to "awaiting processing" from "being processed", the data registration date and time will also be updated, and the date and time at which it was re-registered as "awaiting processing" will become the data registration date and time. In the transfer-use data, data that has been acquired from the data migration service 105 is registered at, for example, the unit of data. In this manner, the data transfer tool 106 sequentially stores the data from the transfer source that is sequentially output by the data migration service 105, which is a data transfer service, to serve as data awaiting transfer on the transfer-use DB 107.

Next, the processing to transfer the transfer-use data that has been stored on the transfer-use DB 107, which is the DB for use in the transfer process of the data transfer tool 106, to the transfer destination cloud service 104 will be explained using FIG. 5. FIG. 5 is a flowchart showing the data transfer processing for data in the First Embodiment. In the present Embodiment, data that is managed by a plurality of related tables is transferred and therefore, there is data (for example, alarm information) that can be transferred only after specific data (for example, device information) has been transferred. In order to quickly transfer data even in the case in which a plurality of related data is transferred, in the present embodiment, data is sequentially transferred from data that satisfies the condition for transfer, and processing is performed to return data that does not satisfy the condition to the transfer-use DB 107. The condition for transferring the processing target data in the First Embodiment is that the necessary information for transferring the processing target data is present, and in the case in which the processing target data is a format that refers to other data, it is necessary that the identification information for the reference source data from after transfer is present. That is, in related data, it is necessary that the reference source data has already been transferred, and that the mapping data is registered. Note that the transfer processing that is shown in FIG. 5 is performed asynchronously with the storage processing for the data that is shown in FIG. 4, and is repeated until the entirety of the data that has been stored on the transfer-use DB 107 has been processed.

In step S501, the processing target data acquisition unit 3231 of the data transfer unit 323 acquires the data that will become the processing target for the transfer processing from the transfer-use DB 107. Specifically, the processing target data acquisition unit 3231 acquires the data for which the data processing status is "awaiting processing" from the data awaiting processing that is stored on the transfer-use DB 107, which is the database for use in the transfer process, and changes the data processing status from "awaiting processing" to "being processed". For example, the processing target data acquisition unit 3231 refers to the data registration date and time for the data that is awaiting processing, and acquires the data in the order from the data for which the registration is older.

In step S502, the processing target data acquisition unit 3231 of the data transfer unit 323 acquires the necessary information to register the processing target data that was acquired during step S501 to the transfer destination system (the data registration-use information) from the transfer-use DB 107. The data registration-use information is the additionally necessary information for transferring the data, and the data registration-use information that should be acquired is defined with a table as the unit. For example, in order to transfer the information for the alarm table, a post-transfer device ID that corresponds to the pre-transfer device ID is necessary, and therefore, the post-transfer device ID is acquired from the mapping data stored on the transfer-use DB 107 to serve as the data registration-use information. In contrast, there is no additionally necessary information for transferring the information for the device table, and therefore, the data transfer unit 323 does not acquire data registration-use information.

Mapping data is data that associates identification information that is issued and by managed each system, such as device IDs and the like, with the transfer source system and the post-transfer system, and is managed as, for example, a mapping table. Table 4 is an example of a mapping table. The mapping table includes table information that shows the type of table for the target data, a transfer source ID that is identification information from the transfer source, and a transfer destination ID that is identification information from the transfer destination. From the mapping table, it can be understood that, for example, although the device ID for the device information that had the device name of "Device 1" in Table 1 was "001" in the transfer source, it has become "1111" in the transfer destination. In the case in which alarm information is transferred, the device ID, which shows the device that generated the alarm, which is registered in the alarm information, is changed from the device ID from the transfer source to the device ID for the transfer destination based on the mapping data.

TABLE 4

| Mapping Table | | |
| --- | --- | --- |
| Table | Transfer Source ID | Transfer Destination ID |
| Device | 001 | 1111 |
| Device | 002 | 2222 |

TABLE 4-continued

| Mapping Table | | |
| --- | --- | --- |
| Table | Transfer Source ID | Transfer Destination ID |
| Alarm | 001 | 1111 |
| . . . | . . . | . . . |

In step S503, the transfer determination unit 3232 of the data transfer unit 323 determines if the data registration-use information that is necessary to transfer the processing target data is present. In the present Embodiment, in the case in which the identification information for separate data that will become the reference destination that is included in the processing target data is included, it will be determined that the data registration-use information that is necessary for transfer is present in the case in which the post-transfer identification information for the separate data that will become the reference destination is able to be acquired. For example, when transferring the information for the alarm table, in the case in which the post-transfer device ID that corresponds to the pre-transfer device ID that is included in the alarm information that the invention is attempting to transfer was able to be acquired during step S403, it will be determined that the registration-use information is present. In contrast, when information for the device table is being transferred, data registration-use information is not necessary and therefore, it will be determined that the data necessary for transfer is present. In the case in which it has been determined that the data registration-use information is present, the processing will proceed to step S505. In contrast, in the case in which it has been determined that the data registration-use information is not all present, the processing will proceed to step S504. By performing the determination in step S503, after data that becomes a reference destination in a plurality of related data (for example, device information) has been transferred, it is possible to transfer the data that references this data (for example, alarm information). Thereby even in the case in which the information for identifying the reference source changes before and after the transfer, it is possible to update the identification information for the reference destination to the identification information for the reference destination post-transfer, and register this.

In step S504, the data re-registration unit 3235 of the data transfer unit 323 performs processing to re-register the data that was acquired during the step S501 to the data storage unit 322 by returning the data processing status for the data that is stored on the transfer-use DB 107 to "awaiting processing". When re-registering data, the data re-transfer unit 323 updates and registers the data registration date and time of the data awaiting transfer to the date and time of the re-registration. In this manner, in the case in which the condition for performing registration processing is not satisfied, it is possible to quickly perform the transfer for all of the data when transferring a plurality of related data, and to shorten the time until the transfer is completed by re-registering this data as "awaiting processing" on the transfer-use DB 107, and moving on to the transfer processing for the next data.

In step S505, the transfer processing unit 3233 of the data transfer unit 323 performs the registration processing on the transfer destination cloud service 104 for transferring the data to the transfer destination cloud service DB 103 of the transfer destination cloud service 104. Then, the transfer processing unit 3233 acquires the registration results for the registration processing from the transfer destination cloud service 104. The registration results are information that shows if the registration (transfer) of the data in the transfer destination cloud service 104 has succeeded or failed. In addition, in the case in which the data registration has succeeded, the registration results include the registration data for the transfer destination such as the post-transfer device ID that has been issued by the transfer destination cloud service 104, and the like.

In step S506, the transfer processing unit 3233 of the data transfer unit 323 determines the registration results for the data that was acquired from the transfer destination cloud service 104. In the case in which the registration results for the data have failed, the processing proceeds to step S504. In step S504, as has been explained above, the data re-registration unit 3235 performs processing to re-register the data that failed to register to the transfer destination cloud service 104 to the data storage unit 322 by returning the data processing status of the data that is stored on the transfer-use DB 107 to "awaiting processing". In addition, the registration date and time for the data that has been re-registered by the data re-registration unit 3235 is updated to the date and time for the re-registration. In contrast, in the case in which the registration results for the data have succeeded, the processing proceeds to step S507.

In step S507, the management unit 324 stores the mapping data on the mapping table of the data storage unit 322. Note that, in the case in which mapping is an unnecessary table, the mapping data will not be stored. Whether or not to store the mapping data is, for example, managed for the transferred data with a table as the unit. For example, in the case in which data that is in the device information table has been transferred, the mapping data is stored, and in the case in which data that is in the alarm information table has been transferred, the mapping data is not stored. Therefore, when device information has been transferred, the mapping for the pre-transfer device ID that is included in the transfer-use data and the post-transfer device ID that has been issued by the transfer destination cloud service 104 is stored. In addition, when alarm information has been transferred, it is not necessary to store the data to the mapping table. In step S508, the data deleting unit 3234 of the data transfer unit 323 deletes the transfer data for which the transfer to the transfer destination cloud service 104 has succeeded from the awaiting processing table of the transfer-use DB 107.

In this manner, the data transfer tool 106 first executes storage processing to sequentially store the data that is sequentially output by the data migration service 105 based on the acquisition from the database for the transfer source system to the data storage unit 322, which is the database for use during the transfer process. Then, the data transfer tool 106 executes registration processing for the data shown in FIG. 5 to the transfer destination concurrently with the storage processing, and sequentially transfers the data from the data that satisfies the condition. Due to this, sequential data transfer from that for which the data becomes present is possible for a plurality of related tables, and it is possible to perform the transfer of data quickly. In addition, by shortening the time taken by the data transfer processing, it is possible to shorten the downtime of the system for the transfer source.

Second Embodiment

In the First Embodiment, the entirety of the data for related tables was transferred. However, there are cases in which in order to increase the speed of the data transfer, only a portion of the data is transferred. For example, in the case in which there is data for multiple countries on the transfer source system, by transferring only the data for a designated country, it is possible to shorten the time needed for one data transfer. For example, when transferring the data for Singapore and China, by performing the transfer with the target for the first data transfer as just the data for Singapore, and just the data for China for the second data transfer, it is possible to shorten the time needed for one data transfer. In the Second Embodiment, processing will be explained in which only the portion of the data that matches a designated condition is transferred. As a specific example of this, in the present Embodiment, processing will be explained in which, in the state in which the information for the seller organizations that manage the devices are managed in a tree, only the data that is linked to the seller organizations for a portion of the countries will be transferred. Note that the same numbers will be used for the constructions and processing that are the same as those in the First Embodiment and the Second Embodiment, explanations thereof will be omitted, and only the differences from the Second Embodiment will be explained below.

First, the data that is transferred in the present Embodiment and the tree structure for the data will be explained using Table 5, and Table 6. Table 5 is an example of seller organization information that is managed by the transfer source service DB 102 of the data transfer source system. Table 6 is an example of device information.

TABLE 5

| Seller Organizations | | | |
| --- | --- | --- | --- |
| Organization ID | Organization Name | Parent Organization | Registration Date |
| AAA | Singapore A | None | 2021 Jan. 1 00:00:00.000 |
| AAB | Singapore B | Singapore A | 2021 Jan. 1 01:00:00.000 |
| BBB | China A | None | 2021 Jan. 2 00:00:00.000 |
| . . . | . . . | . . . | . . . |

The seller organization information includes, for example, an organization ID that uniquely identifies an organization, an organization name, a parent organization that is the higher order organization for the organization, and the registration date.

TABLE 6

| Device Information | | | | | |
| --- | --- | --- | --- | --- | --- |
| Device ID | Device Serial | Device Name | Seller Organization | Manager | Registration Date |
| 0001 | 111-111-111 | Device 1 | AAA | UserX | 2021 Jan. 1 00:00:00.000 |
| 0002 | 222-222-222 | Device 2 | AAB | UserX | 2021 Jan. 1 01:00:00.000 |
| 0003 | 333-333-333 | Device A | BBB | UserY | 2021 Jan. 2 00:00:00.000 |
| . . . | . . . | . . . | . . . | . . . | . . . |

The device information includes, in addition to the contents of Table 1, the seller organization information. Information that shows the organization that sold the device, such as an organization ID or the like, is registered in the seller organization information.

In the present Embodiment, it is assumed that within the seller organizations, the Singapore A organization and the China A organization are registered as headquarters organizations. In this context, a headquarters organization refers to an organization that is at the top of the organizations managed in a tree. The Singapore B organization falls underneath the umbrella of the Singapore A organization, and the Singapore A organization is the parent organization of the Singapore B organization. Note that in this context, although organizations that do not have parent organizations are made headquarters organizations, organizations may also be made headquarters organizations in the case of a specific organization ID for parent organizations, or headquarters organizations may also be designated by providing a headquarters organization flag.

Next, the transfer target management table that manages whether or not to transfer the target data when transferring data will be explained using Table 7. Table 7 is an example of a transfer target management table. Whether data is a transfer target or a non-transfer target is managed in the transfer target management table. In the present embodiment, the organization at the top of the seller organization tree that is being transferred is registered in the transfer target management table. The transfer target management table is managed by the management unit 324 of the data transfer tool 106.

TABLE 7

| Transfer Target Management Table | | |
| --- | --- | --- |
| Target Table | Target ID | Transfer Flag |
| Seller Organizations | AAA | True |
| Seller Organizations | BBB | False |
| . . . | . . . | . . . |

The transfer target management table includes, for example, a target table that indicates the transfer target, a target ID, and a transfer flag. In the present embodiment, the seller organization table (Table 5) is registered in the target table, the organization ID is registered in the target ID, and one of "true", which shows that it is a transfer target, or "false", which shows that it is a non-transfer target, is registered in the transfer flag. In the example in Table 7, the Singapore A organization is a transfer target, and the China A organization is a non-transfer target. Note that in the case in which device information has been registered in this table, "device" will be registered in the target table, and the device ID such as "0001" or the like will be registered in the target ID.

Figure 6:
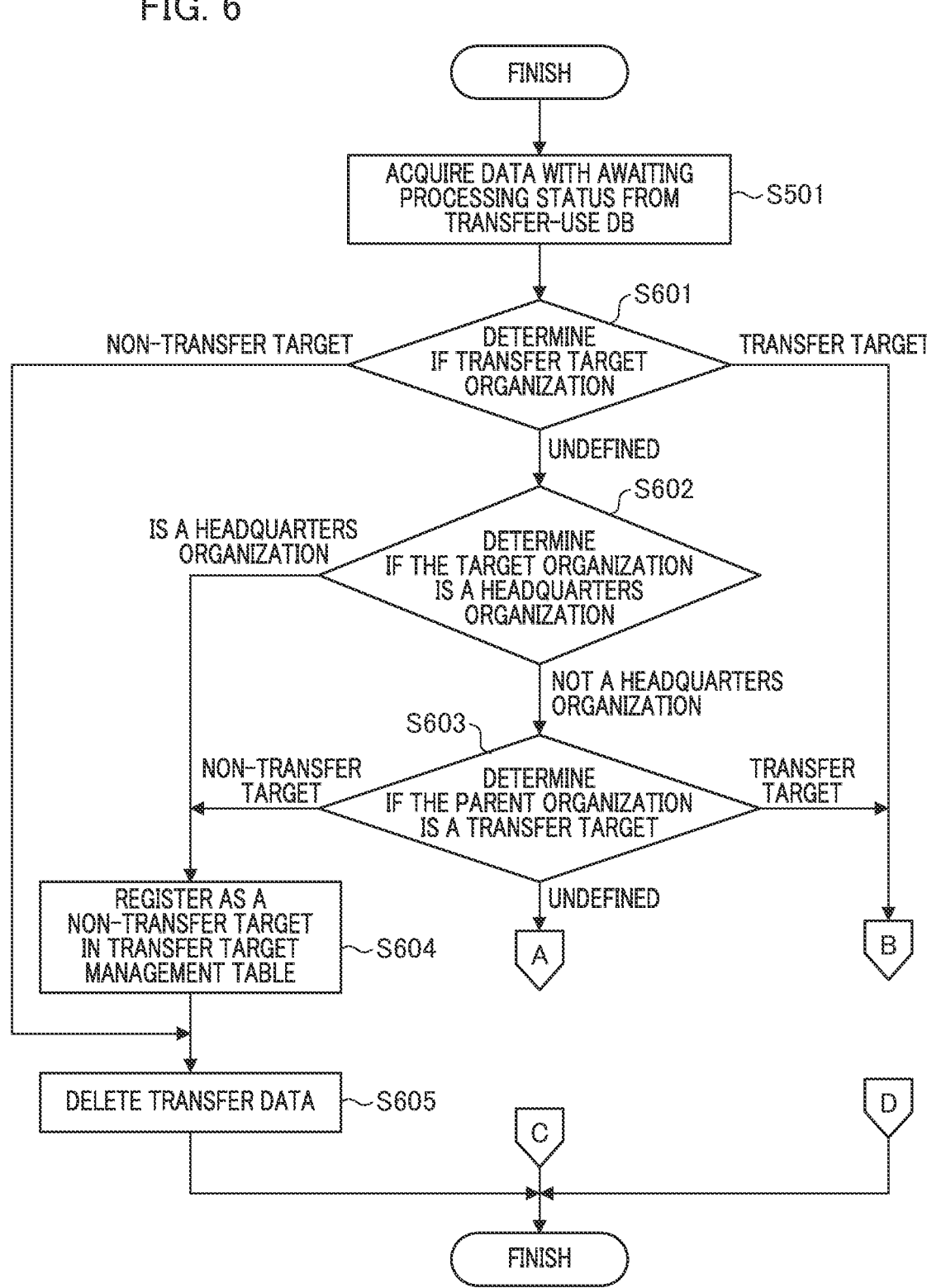
FIG. 6 is a flowchart showing data transfer processing in a Second Embodiment.
Figure 7:
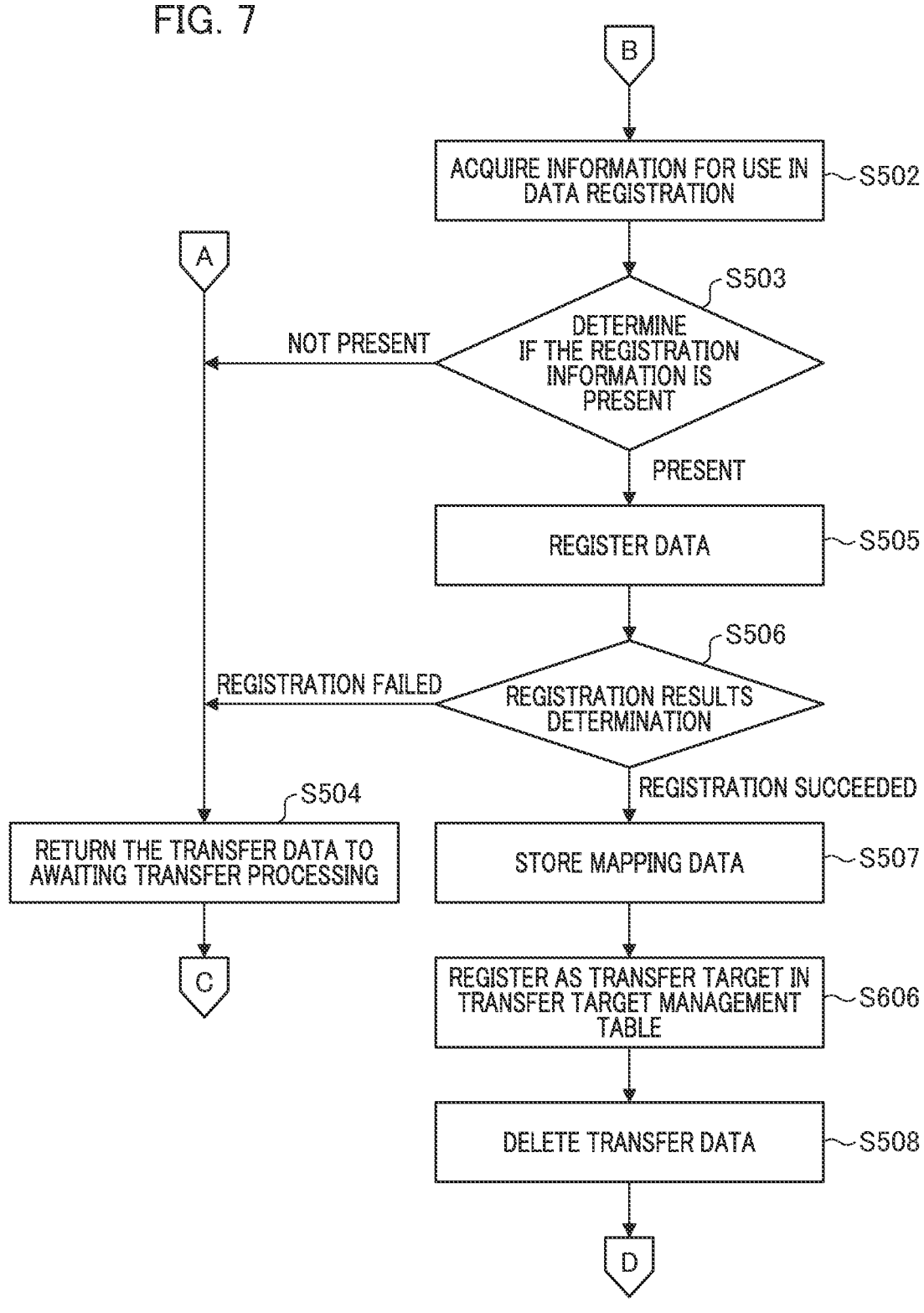
FIG. 7 is a flowchart showing data transfer processing in the Second Embodiment

Next, the data transfer processing for a case in which the device information (table 6) is transferred will be explained. The processing for storing the data from the transfer source in the transfer-use DB 107 via the data migration service 105 is the same as that in the First Embodiment. The processing to transfer only the data that has been designated from the data that has been stored to the transfer-use DB 107 to the transfer destination cloud service 104 will be explained using FIG. 6, and FIG. 7. FIG. 6, and FIG. 7 are flowcharts showing data transfer processing in the Second Embodiment. In the present Embodiment, an example is explained in which the data from one portion of the tree range for the seller organizations that are managed in a tree structure is transferred by the data transfer tool 106. Each process that is shown in FIG. 6, and FIG. 7 is realized by the CPU 201 opening and executing a program that has been stored on a memory (the ROM 203 or the storage device 206) on the RAM 204. Note that the data transfer processing that is shown in FIG. 6, and FIG. 7 is performed asynchronously with the data storage processing that is shown in FIG. 4, and is repeated until the entirety of the data that has been stored on the transfer-use DB 107 has been processed.

Whether or not the processing target data that was acquired from the transfer-use DB 107 during Step S501 is data that has been designated in a transfer target is determined during step S601 to step S603. In the case in which it is determined that the data is a transfer target, the processing proceeds to step S502, and transfer processing is performed in the same manner as in the First Embodiment (FIG. 5). In contrast, in the case in which it is determined that the data is a non-transfer target, the data is deleted from the transfer-use DB 107 during step S604, and step S605.

Firstly, the processing for determining whether or not data is a transfer target during step S601 to step S603 will be explained. Whether or not data is a transfer target is determined based on the information that is included in the processing target data. In the present Embodiment, in the case in which the seller organization for the processing target data is included in an organization that has been designated to serve as a transfer target, it is determined that the processing target data is a transfer target. In step S601, the transfer determination unit 3132 of the data transfer unit 323 determines if the processing target data that was acquired during step S501 is a transfer target based on the transfer target management table. In the present embodiment, the transfer target management table is searched based on the seller organization ID that is included in the device information, and a determination is performed. In the case in which the seller organization ID for the processing target data has been registered as a transfer target, it is determined to be a transfer target, and the processing proceeds to step S502. In the case in which the seller organization has been registered as being a non-transfer target, it is determined to be a non-transfer target, and the processing proceeds to step S605. In addition, in the case in which the seller organization has not been registered as either a transfer target or as a non-transfer target, it is determined to be un-defined, and the processing proceeds to step S603. In the example in Table 7, in the case in which the seller organization is the Singapore A organization, this will be determined to be a transfer target, in the case in which it is the China A organization, this will be determined to be a non-transfer target, and in the case that it is the Singapore B organization, this will be determined as undefined.

In the case in which a seller organization has been registered as a non-transfer target, in Step S605, the data deleting unit 3234 of the data transfer unit 323 will delete the data that was acquired during step S501 from the data awaiting processing table.

In the case in which the seller organization for the processing target data is a transfer target organization or is undefined, whether or not the processing target data is a transfer target will be determined according to whether or not the parent organization of the seller organization is a transfer target. In the case in which the seller organization is included in a transfer target organization, that is, in the case in which the parent organization of the seller organization is a transfer target, the processing target data will be determined to be a transfer target and the transfer processing will proceed. The details of the processing for the case in which the seller organization for the processing target data is a transfer target or is undefined will be explained in step S602 to step S604.

In step S602, the transfer determination unit 3232 of the data transfer unit 323 determines if the organization for the transfer target data is a headquarters organization based on the seller organization information (Table 5). That is, it determines if the organization for the transfer target data is at the top of the seller organization tree. In the case in which the organization for the transfer target data is not a head-quarters organization, the processing proceeds to step S604. In contrast, in the case in which the organization for the transfer target data is a headquarters organization, the pro-cessing proceeds to step S604. In the case in which the organization for the transfer target data is a headquarters organization but whether or not it is a transfer target orga-nization is undefined, it will be determined to be an orga-nization that has not been designated as a transfer target. Therefore, in step S604, the management unit 324 will register the seller organization that is the target as being a non-transfer target in the transfer target management table (Table 7). After the seller organization for the processing target data has been registered as being a non-transfer target in the transfer target management table, the processing proceeds to step S605, and the data deleting unit 3234 deletes the processing target data from the data awaiting processing table.

In the case in which the seller organization for the processing target data was not a headquarters organization, during step S603, the data transfer unit 323 determines if the parent organization for the seller organization of the pro-cessing target data is a transfer target. Note that, although in the present embodiment, up until the parent organization is confirmed with respect to whether or not the top organiza-tion is a transfer target, it may also be made such that confirmation is made by tracing the organization back to a plurality of hierarchies such as the parent of a parent. In the case in which the parent organization has been registered as being a non-transfer target, it is determined that the seller organization for the processing target data is a non-transfer target, and the processing proceeds to step S604. In the case in which the parent organization is a non-transfer target, the subsidiary is also a non-transfer target, and therefore, during step S604, the management unit 324 registers the seller organization for the processing target data as being a non-transfer target in the transfer target management table. In contrast, in the case in which the parent organization has been registered as a transfer target, the target organization is determined to be a transfer target, and the processing pro-ceeds to step S503. In the case in which the parent organi-zation has not been registered as either a transfer target or as being a non-transfer target, it is determined to be undefined, and the processing proceeds to step S504. During step S504, the data re-registration unit 3235 re-registers the processing target data to the transfer-use DB 107, which is the database for use during the transfer process, by returning the data processing status in the table for the data awaiting process-ing to "awaiting processing" in the data awaiting processing table. By deferring the processing for the data for which it is unknown whether or not it is processing target, and moving on to the processing for the next data, it is possible to shorten the time taken by the data transfer processing.

Step S502 to Step S507 are the same as those in the First Embodiment. The data is registered to the transfer destina-tion system, and after the mapping data is stored during step S507, the processing proceeds to step S606. During Step S606, the management unit 324 registers the seller organi-zation for the transferred data as a transfer target. Specifi-cally, the management unit 324 registers the organization ID corresponding to the seller organization for the transferred data as a transfer target (the transfer flag "true") in the transfer target management table. Due to the processing in step S606, it is possible to also transfer the subsidiaries of a seller organization that has been registered as the current transfer target during the following processing. Once the registration as a transfer target of the seller organization for the data that was transferred during step S606 is completed, the processing proceeds to step S508, the data is transferred and deleted from the transfer-use DB 107, and the transfer processing for the data that was acquired during S501 is completed. Due to the above processing, it is possible to transfer just the device information that is managed by the seller organization that has been designated as the transfer target and the seller organizations that fall under the umbrella of this seller organization.

As has been explained above, it is possible to transfer just the portion of the data that is linked to the target that has been designated as the transfer target, and it is possible to shorten the time taken until the data transfer is completed. In addition, by initially designating a headquarters organization as the transfer target, it is possible to perform the transfer in order from the higher order organizations, and it is possible to appropriately perform the transfer of a plurality of related tables such as hierarchical data and the like.

Third Embodiment

In the Third Embodiment, an example of processing to transfer only a portion of the data that matches a designated condition that is different from the Second Embodiment will be explained. As a specific example, in the present embodi-ment, processing will be explained in which, in the state in which the information for seller organizations that manage the devices is managed in a tree, only data that is linked to the seller organizations for a portion of the countries will be transferred. Note that the same numbers will be used for the constructions and processing that are the same as those in the First Embodiment and the Second Embodiment, explana-tions thereof will be omitted, and only the differences with the Second Embodiment will be explained below.

Figure 8:
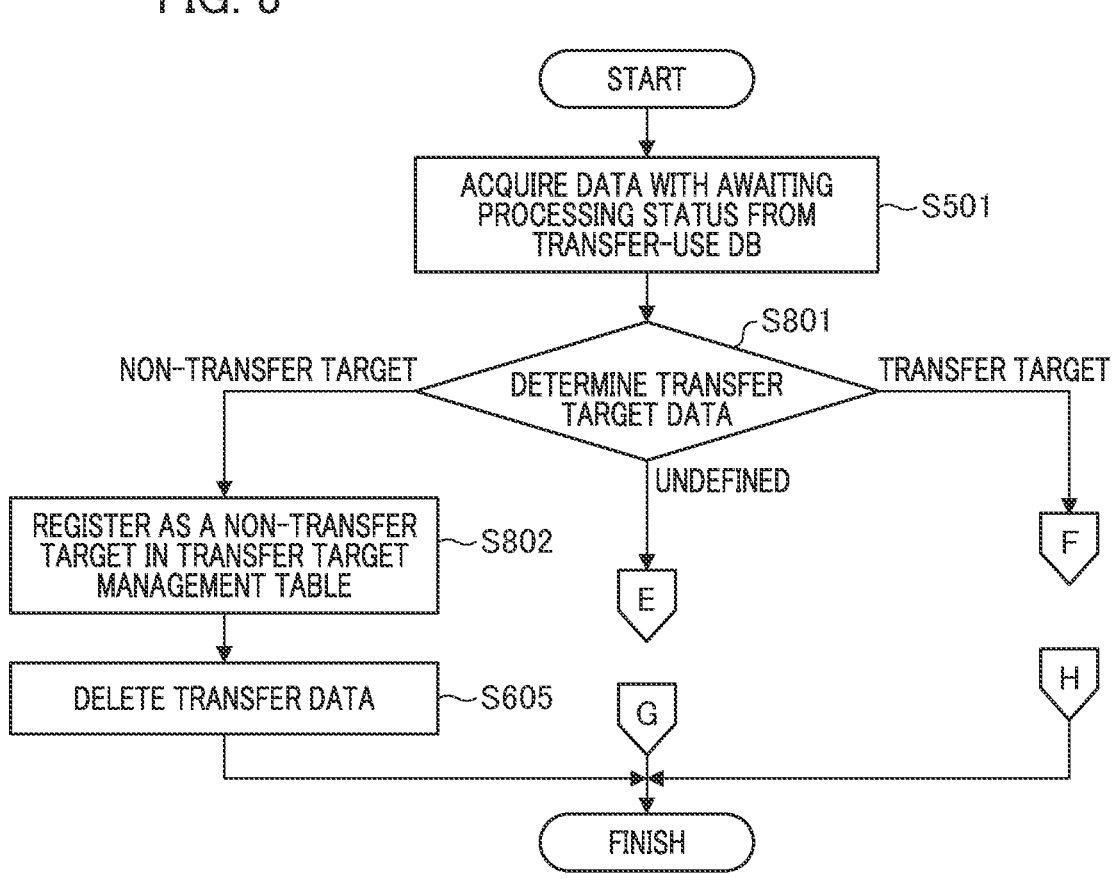
FIG. 8 is a flowchart showing data transfer processing in a Third Embodiment.
Figure 9:
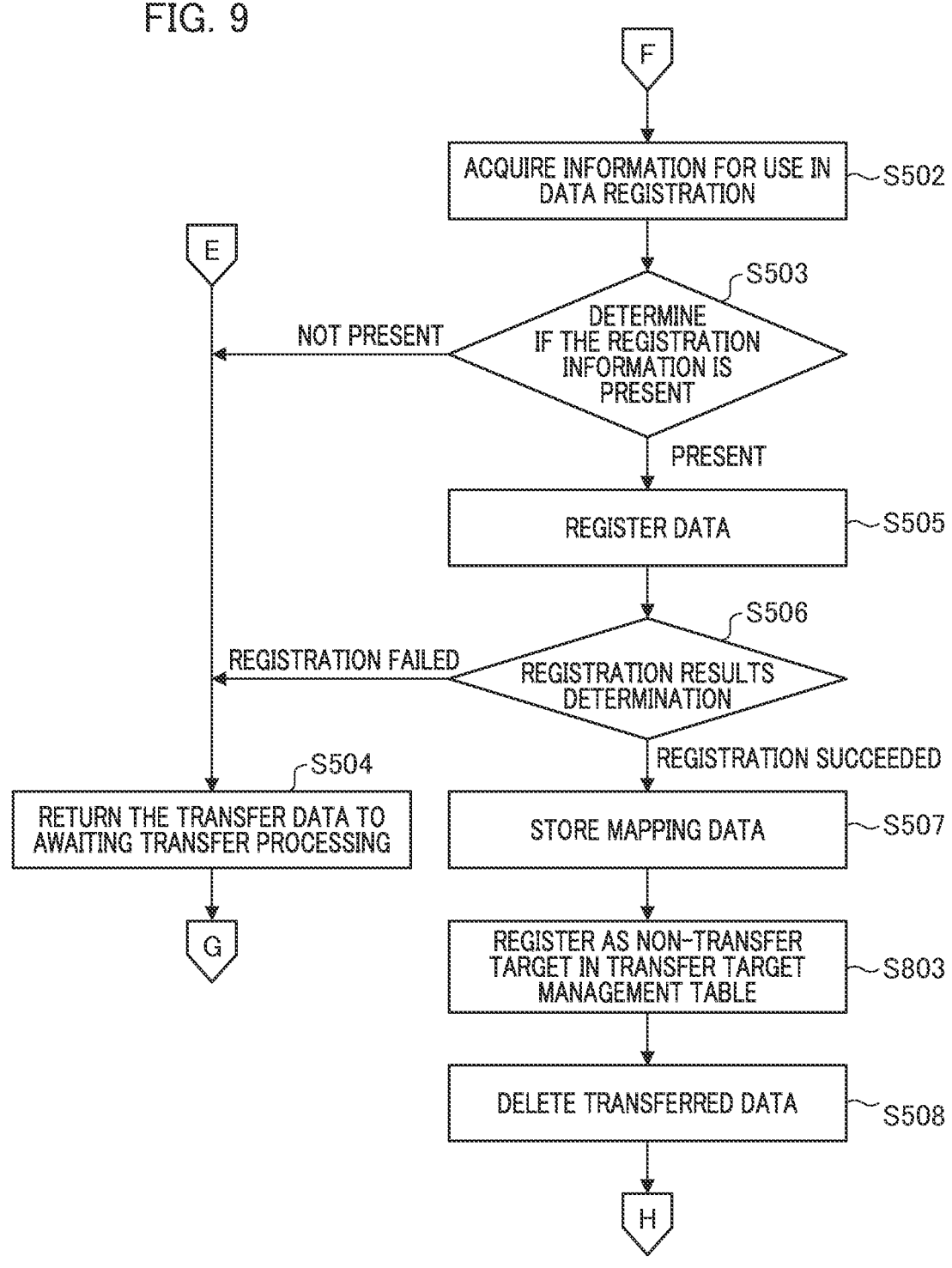
FIG. 9 is a flowchart showing data transfer processing in the Third Embodiment.

The processing for storing the data on the transfer-use DB 107 via the data migration service 105 from the transfer source is the same as that in the First Embodiment. The processing for transferring only the data that has been designated from the data that has been stored on the transfer-use DB 107 to the transfer destination cloud service 104 will be explained using FIG. 8, and FIG. 9. FIG. 8, and FIG. 9 are flowcharts showing data transfer processing in the Third Embodiment. In the present Embodiment, an example will be explained in which the data transfer tool 106 transfers the device information and alarm information of the tree range for a portion of the seller organizations that are managed in the tree structure. In the present embodiment, the device information that is the processing target is that from Table 6, and the alarm information is that from Table 2. Each process that is shown in FIG. 8, and FIG. 9 is realized by the CPU 201 opening and executing a program that has been saved on a memory (the ROM 203 or the storage device 206) on the RAM 204. Note that the transfer processing for the data that is shown in FIG. 8, and FIG. 9 is performed asynchronously with the storage processing for the data that is shown in FIG. 4, and is repeated until the entirety of the data that has been stored on the transfer-use DB 107 has been processed.

During step S801, whether or not the processing target data that was acquired from the transfer-use DB 107 during step S501 is data that has been designated as a transfer target is determined. During Step S801, the data transfer unit 323 of the data transfer tool 106 determines if the processing target data is a transfer target based on the transfer target management table. Specifically, the data transfer unit 323 searches the transfer target management table for the transfer target determination information that is included in the processing target data, and determines if the data is a transfer target. In this context, the transfer target determination information is information that shows the data for the higher order table. For example, the transfer target determination information in the device information is the seller organization ID, and the transfer target information in the alarm information is the device ID. In addition, in the Second Embodiment, the information that is included in the transfer target management table (table 7) only pertained to the seller organizations. However, in the present embodiment, if data is from a higher order table, it is registered. That is, in the present embodiment, the device information is also registered in the transfer target management table in addition to the seller organization, and transfer flags are set for each ID that shows data.

Therefore, during step S801, in the case in which the device information is processing target data, the data transfer unit 323 searches the transfer target management table using the seller organization ID, which is the ID for the higher order table that is included in the device information. In addition, in the case in which alarm information or device information is the processing target data, the data transfer unit 323 searches the transfer target management table using the device ID, which is the ID for the higher order table that is included in the alarm information. In addition, in the case in which the transfer target determination information has been registered as a non-transfer target in the transfer target management table, the processing target data is determined to be a non-transfer target, and the processing proceeds to step S802. In the case in which the transfer target determination information has been registered as a transfer target in the transfer target management table, the processing target data is determined to be a transfer target, and the processing proceeds to step S502. In the case in which the transfer target determination information has not been registered as either a transfer target or a non-transfer target in the transfer target management table, it is determined to be undefined, and the processing proceeds to step S504.

In the case in which the transfer target determination information is undetermined, in step S504, the data transfer unit 323 re-registers the processing target data to the transfer-use DB 107, which is the database for use during the transfer process by returning the data processing status for the data awaiting processing table to "awaiting processing". By deferring the processing for data for which whether or not it is a processing target is unknown, and moving on to the processing for the next data, it is possible to shorten the time taken by the data transfer processing.

In the case in which it has been determined that the processing target data is a non-transfer target, during the step S802, the data transfer unit 323 registers the ID for the specific processing target data as being a non-transfer target in the transfer target management table. In this context, the specific data that needs to be registered in the transfer target management table is the relationship with other data, and the data for the higher order table. For example, the device information is related to the alarm information, and the device table is the higher order data for the alarm information table, and therefore, the device information is registered in the transfer target management table. In contrast, data that is not referenced by other data is not stored. No tables exist that are related to the alarm information, and the alarm ID is not referenced, and therefore, this does not need to be stored in the transfer target management table. The type of the specific data that needs to be registered to the transfer target management table may also, for example, be designated by a user. In addition, it may also be made such that only the data that has been stored on the mapping table during step S507 is stored to the transfer target management table.

In the case in which the processing target data has been determined to be a transfer target, the processing proceeds to step S502. Step S502 to step S507 are the same as the processing in the First Embodiment. The data is registered to the transfer destination system, and after the mapping data is stored during the step S507, the processing proceeds to step S803. During step S803, the data transfer unit 323 registers the ID for the data that has been transferred to the transfer destination in the transfer target management table as a transfer target according to necessity. Note that the ID that is registered in the transfer target management table is the ID that has been issued by the transfer source system. The determination as to whether or not something is a target for registration to the transfer target management table is the same as that in step S802. After this, during the step S602, the transfer data is deleted from the awaiting processing table. Note that although in the present embodiment, an example has been explained in which during the step S802, and the step S803, data is registered to the transfer target management table according to necessity, this is not limited thereto. For example, it may also be made such that whether or not all of the data is a transfer target is registered to the transfer target management table without performing the determination of the necessity to register the data.

As has been explained above, it is possible to transfer just a portion of the data that is linked to the target that has been designated as the transfer target, and it is possible to shorten the time taken until the data transfer is completed.

In the First Embodiment to the Third Embodiment, examples have been explained in which the storage processing (FIG. 4) for the data and the transfer processing (FIG. 5 to FIG. 9) by the data transfer tool 106 are performed asynchronously. However, it may also be made so that the transfer processing is executed at the same time as the completion of the storage processing. In the case in which the transfer processing and the storage processing are synchronized, the transfer processing will begin once all of the data that has been acquired from the transfer source service 108 by the data migration service 105 has been stored in the transfer-use DB 107. In the present embodiment as well, it is possible to quickly perform the transfer of data, and to shorten the time taken during the transfer by performing transfer processing using the data transfer processing tool 106.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-193540, filed Nov. 29 2021, which is hereby incorporated by reference herein in its entirety.

What is claimed is:

1. An information processing apparatus configured to provide a data transfer support system that works in cooperation with a data transfer service, the information processing apparatus comprising:

a memory storing instructions; and a processor executing the instructions causing the information processing apparatus to:

receive, from the data transfer service, data that is sequentially output by the data transfer service based on collective acquisition from a first database of a transfer source system, wherein data stored in the first database is managed as a plurality of related tables, and the data managed in the plurality of related tables includes data that requires sequence control for registration of data in a third database of a transfer destination system;

execute storage processing to sequentially store the received data in a second database for use during a transfer process, by the data transfer support system, wherein the second database is different from the first database and the third database;

acquire, asynchronously to the storage processing, the data from the second database;

determine whether the data acquired from the second database satisfies a condition;

register the acquired data with the third database in the case in which the data that has been acquired from the second database satisfies the condition;

re-register the acquired data with the second database in the case in which the data that has been acquired does not satisfy the condition, wherein the data re-registered with the second database is re-acquired for registration with the third database based on the condition; and manage a mapping data that associates identification information that has been issued by the third database with identification information prior to registration in the third database, wherein, when information referenced by the data acquired from the second database contains identification information, in the case in which the identification information issued by the third database associated with the identification information prior to the registration in the third database is managed by the mapping data, the processor determines that the data acquired from the second database satisfies the condition and registers the acquired data with the third database, and in the case when the identification information issued by the third database associated with the identification information prior to the registration in the third database is not managed by the mapping data, the processor determines that the data acquired from the second database does not satisfy the conditions and re-registers the acquired data with the third database.

2. The information processing apparatus according to claim 1, wherein the processor further executes an instruction causing the information processing apparatus to delete, from the second database, the data that has been registered with the third database.

3. The information processing apparatus according to claim 1, wherein, in the case in which the data that has been acquired from the second database satisfies the condition, and in the case in which the registration of the data with the third database has failed, the processor re-registers the data with the second database.

4. The information processing apparatus according to claim 1, wherein the processor acquires the data from the second database in the order of an oldest registration date and time at which the data has been registered in the second database, and the processor updates the registration date and time for the data when re-registering the data with the second database.

5. The information processing apparatus according to claim 1, wherein, in the case in which only a portion of transfer target data from among the data that has been stored on the second database is being transferred, and in which the condition for the transfer target is designated based on information managed in a tree structure, the processor further executes instructions causing the information processing apparatus to manage whether data is a transfer target or a non-transfer target in a management table, in the case in which information that is included in the data that has been acquired by the processor is included in the transfer targets that are managed in the management table, the processor registers the data that has been transferred as a transfer target in the management table, in the case in which information that is included in the data that the processor has acquired is included in the non-transfer targets managed in the management table, the processor registers the data as a non-transfer target in the management table, and in the case in which information that is included in the data that has been acquired by the processor has not been defined as being either a transfer target or a non-transfer target in the management table, the processor re-registers the data with the second database.

6. The information processing apparatus according to claim 5, wherein, in the case in which information that is included in the data that has been acquired by the processor has not been defined as being either a transfer target or a non-transfer target in a management table, in the case in which higher order information in the tree structure for the information is included in the transfer targets that are managed by the management table, the processor registers the information as a transfer target in the management table; and in the case in which the information is the highest order in the tree structure, or in the case in which higher order information in the tree structure for the information is included in the non-transfer targets that are managed in the management table, the processor registers the information as being a non-transfer target in the management table.

7. A data transfer method by a processor of an information processing apparatus of a data transfer support system that works in cooperation with a data transfer service, the method executed by the processor comprising:

receiving, from the data transfer service, data that is sequentially output by the data transfer service based on collective acquisition from a first database of a transfer source system, wherein data stored in the first database is managed as a plurality of related tables, and the data managed in the plurality of related tables includes data that requires sequence control for registration of data in a third database of a transfer destination system;

executing storage processing to sequentially store the received data, on a second database for use during a transfer process by the data transfer support system, wherein the second database is different from the first database and the third database;

acquiring, asynchronously to the storage processing, the data from the second database;

determining whether the data acquired from the second database satisfies a condition;

registering the acquired data with the third database, in the case in which the data that has been acquired from the second database satisfies the condition;

re-registering the acquired data with the second database in the case in which the data that has been acquired does not satisfy the condition, wherein the data re-registered with the second database is re-acquired for registration with the third database based on the condition; and managing a mapping data that associates identification information that has been issued by the third database with identification information prior to registration in the third database, wherein, when information referenced by the data acquired from the second database contains identification information, in the case when the identification information issued by the third database associated with the identification information prior to the registration in the third database is managed by the mapping data, the processor determines that the data acquired from the second database satisfies the condition and registers the acquired data with the third database, and in the case when the identification information issued by the third database associated with the identification information prior to registration in the third database is not managed by the mapping data, the processor determines that the data acquired from the second database does not satisfy the condition and re-registers the acquired data with the third database.

\* \* \* \* \*